United States Patent [19]

Wilkins et al.

[11] 4,406,856
[45] Sep. 27, 1983

[54] REMOVAL OF PORTIONS OF TUBES FROM STEAM GENERATOR OF NUCLEAR REACTOR

[75] Inventors: Robert L. Wilkins, Houston, Tex.; Charles F. Williams, Swartz Creek, Mich.

[73] Assignee: Westinghouse Electric Corp., Pittsburgh, Pa.

[21] Appl. No.: 192,159

[22] Filed: Sep. 29, 1980

[51] Int. Cl.³ .............................................. G21C 19/00
[52] U.S. Cl. ................................ 376/260; 294/86.12; 165/76; 29/157.4; 29/402.03; 29/727
[58] Field of Search ............... 376/260, 402, 405, 406; 414/146; 165/76; 29/2.18, 2.25, 157.4, 726, 727, 402.01, 402.03; 408/80, 100, 111; 294/86.12

[56] References Cited

U.S. PATENT DOCUMENTS

| | | | |
|---|---|---|---|
| 4,158,415 | 6/1979 | Young | 165/76 |
| 4,168,782 | 9/1979 | Sturges | 165/76 |
| 4,192,053 | 3/1980 | Blanco | 165/76 |
| 4,213,239 | 7/1980 | Filer | 29/726 |
| 4,231,690 | 11/1980 | Burns | 408/80 |
| 4,280,274 | 7/1981 | Filer | 29/726 |
| 4,292,731 | 10/1981 | Filer | 29/726 |
| 4,312,124 | 1/1982 | Calhoun | 29/726 |

FOREIGN PATENT DOCUMENTS

| | | |
|---|---|---|
| 10175 | 4/1980 | European Pat. Off. . |
| 1498748 | 1/1978 | United Kingdom . |
| 1544808 | 4/1979 | United Kingdom . |
| 1561343 | 2/1980 | United Kingdom . |

*Primary Examiner*—Donald P. Walsh
*Attorney, Agent, or Firm*—L. A. DePaul

[57] ABSTRACT

After the tube portion to be removed is severed from the remainder of the U-tube and its weld to the header is machined off, the internal surface of the portion is engaged internally by an ID gripper and pulled out of the header. Then the external surface is engaged by an OD gripper and pulled further out of the header. The first tube length is pulled out as far as the space under the header permits and is then cut off. Successive lengths are likewise pulled out and cut off.

The apparatus for accomplishing this object includes a base secured to the header by expanded mandrel mechanisms. A carriage is suspended from the base on screws which are driven by a motor to move the carriage away from and towards the base. An OD gripper assembly is suspended from the carriage and is movable by fluoroactuated piston rods away from and towards the carriage. An ID gripper assembly extends through the OD gripper assembly. The gripper of the ID assembly is actuable to engage the internal surface of the tube portion. With its gripper so engaged the ID assembly is engaged by the gripper of the OD assembly and the engaged tube portion is pulled out of the header by the OD assembly. The ID gripper is then disengaged and the OD gripper is engaged with the tube portion in the same way that it engages the ID assembly and the tube portion is pulled out further.

The apparatus also includes a tube cutter having an abrasive wheel. The wheel cuts the lengths of the tube portion at an angle so that for examination and testing the tube lengths can be matched and the orientation of any defect with respect to the plate in the steam generator which separates the inlet and outlet ends of the tubes and the U-tube supports can be identified.

18 Claims, 31 Drawing Figures

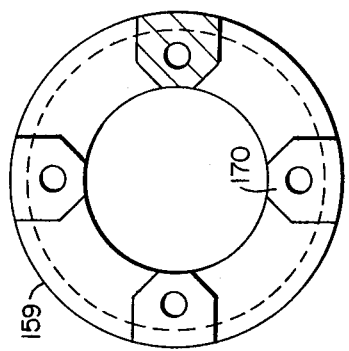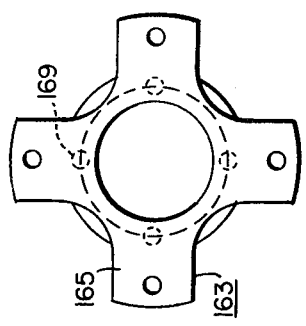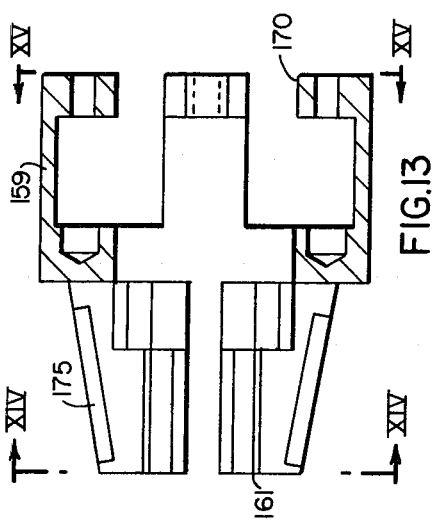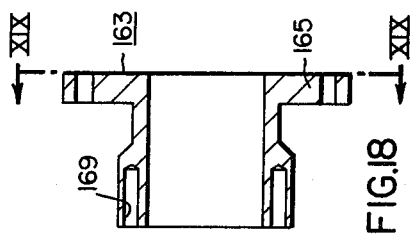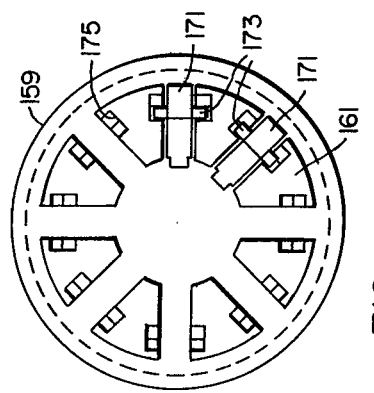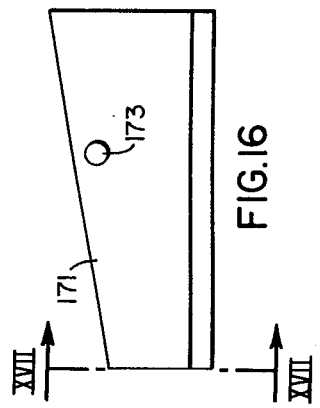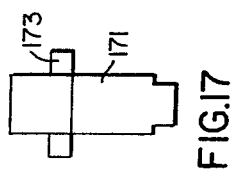

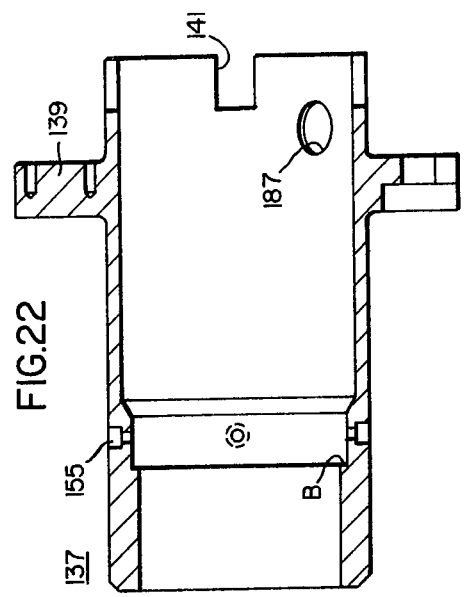
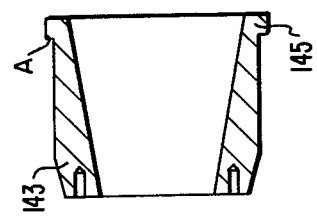
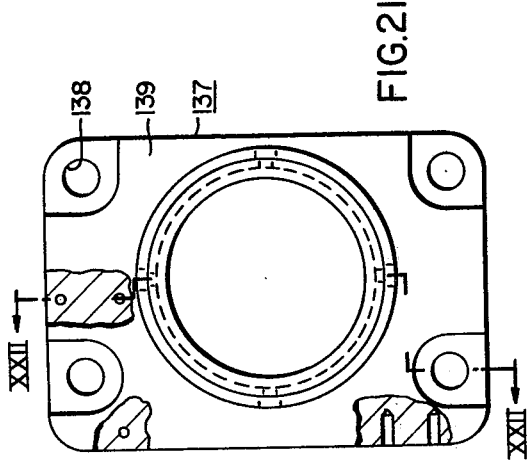

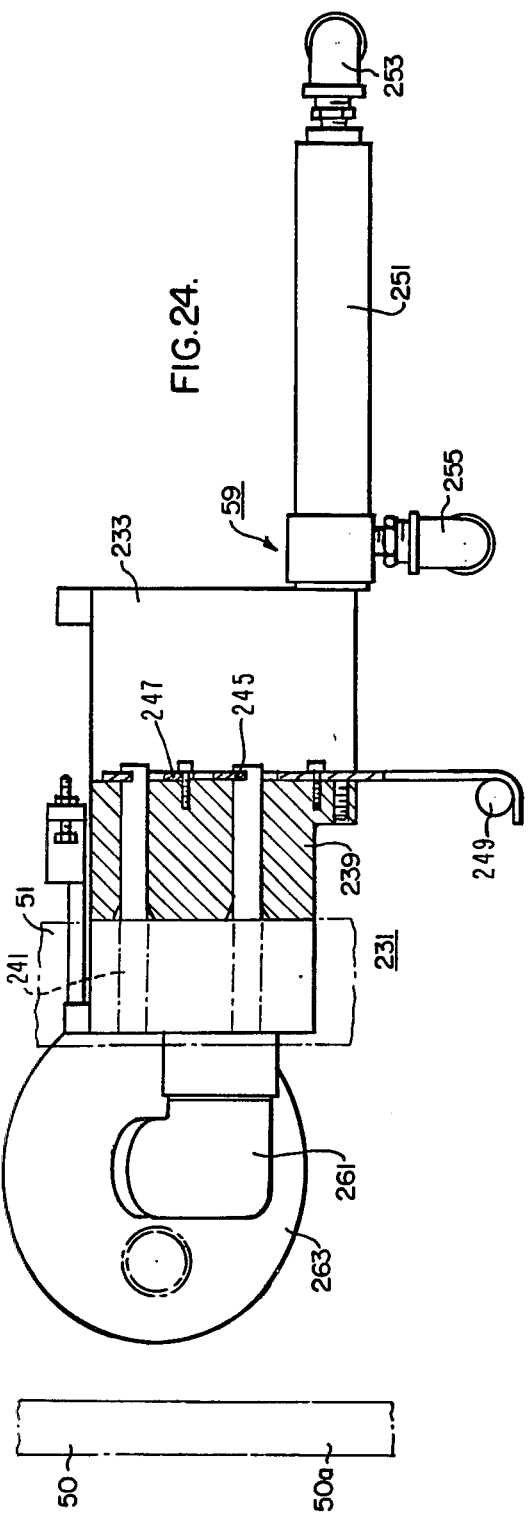
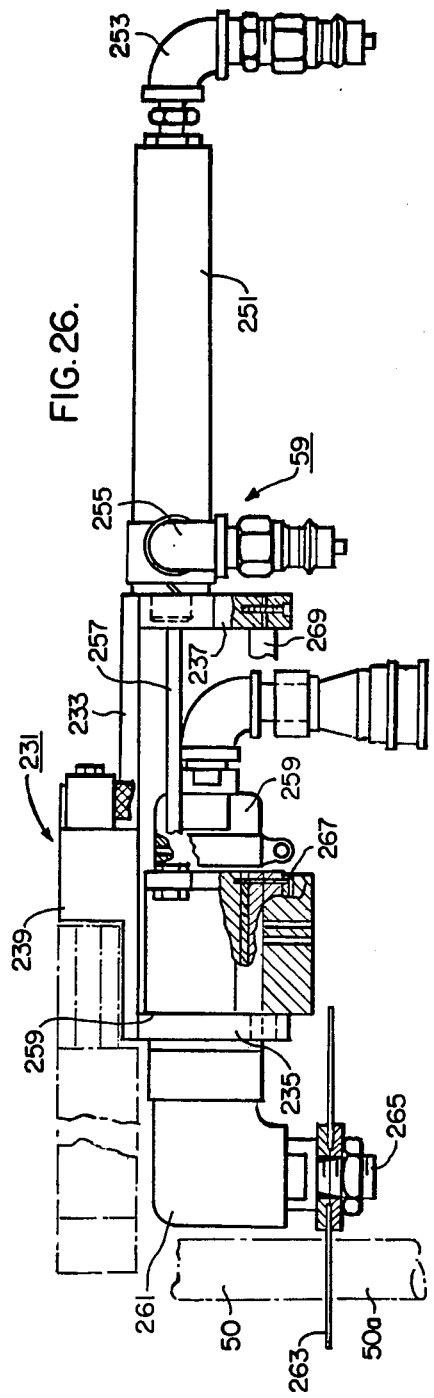
FIG.24.
FIG.26.

REMOVAL OF PORTIONS OF TUBES FROM STEAM GENERATOR OF NUCLEAR REACTOR

BACKGROUND OF THE INVENTION

This invention relates to the art of nuclear reactor power generation and it has particular relationship to the steam generators of nuclear reactor power generating systems. It is to be understood that while this invention is uniquely applicable to, and has its predominant use in, nuclear reactor power generation, the practice of this invention in other areas is within the scope of this application and of any patent which may issue on or is a result thereof.

The steam generators involved in this invention include a plurality of U-tubes which serve as a primary water circuit for circulating the hot water from and back to the reactor in heat-exchange relationship with the secondary water. There are also steam generators (once through steam generators) with straight tubes. The primary water is highly radioactive. Failure of some of the primary U-tubes and resulting leakage from these failed tubes has been experienced. The leakage of radioactive primary water into the secondary water is unacceptable and to suppress the leakage, the defective tubes must be plugged. Where it becomes necessary to plug more and more tubes, performance of the generator is deteriorated with a resulting loss in megawatt output capability. It is then necessary to remove sample tube portions from the generator and subject these samples to extensive tests to determine the failure mode and prevent or suppress further failures.

In accordance with the teachings of the prior art, the removal of the tube portion is carried out in a repetitive series of tasks which require entry of personnel into the highly radioactive primary cavity of the steam generator each time that a task of the series is to be performed. Each person who performs a task can be exposed only to his maximum legal radiation level and usually performs useful work for only a few minutes. The number of persons which are required to remove a single tube portion typically may vary from about five to about one hundred twenty. In each case, the number required is determined by the length of tube portion to be extracted, the location of the tube portion, the radiation intensity in the generator and other factors.

The practice of this prior art process is not only uneconomical but it is also costly in the availability of highly trained personnel. Persons who enter the radioactive environment of the steam generator are restricted from entering any other radioactive environment for as long as three-month intervals and are rendered ineffective as field personnel during such intervals.

It is an object of this invention to overcome the disadvantages and drawbacks of the prior art and to provide apparatus and a method in whose use and practice the removal of tube portions from a steam generator shall be carried out remotely without significant exposure of field personnel to highly radioactive fields.

For the reliability of the investigation of the tube portions, it is essential that the damage to the tube portion surfaces be minimized and that the portions be removed in such manner that the orientation and location of any defects be reliably determinable. It is an object of this invention to provide apparatus for removing tube portions from a steam generator which shall operate in such manner that the damage to the removed tube portions shall be minimized and the orientation and location of any defects be readily determinable.

SUMMARY OF THE INVENTION

In the typical practice of this invention, selected U-tubes or straight tubes which carry the primary water current from the reactor are probed periodically by an eddy-current probe. Such a probe may be procured from Zetec, Inc., Issaquah, Wash. A portion of a tube manifesting a defect is severed from the generator and from the header which is sometimes called the tubesheet. Typically the portion should be cut-off not less than three inches from a tube support and not less than three inches above or below a defect. In accordance with this invention the internal surface of the portion of the tube to be removed is initially gripped and the end of the portion is extracted from the header. Thereafter, the external surface of the tube portion is gripped and the tube portion is pulled out of the header further. Typically, the length of the space under the header is about nineteen to forty-five inches while the portion to be removed may have a length as high as 250 inches. The tube portion is removed in sections or lengths, each length being cut off after it is pulled out of the header. The sections are cut by a suitable abrasive saw. The saw cuts the tubes at an angle or on a bias. Each of the lengths are appropriately labeled so that the lengths may be assembled in the same relationship as they had to each other within the generator.

The apparatus for practicing this invention includes a base which is secured to the underside of the header. A carriage is suspended on screws secured to the underside of the base. The screws are driven to move the carriage away from and towards the base. An OD, outer surface, gripper assembly is suspended from the carriage and is movable away from and towards the carriage by fluid actuated piston rods. At the start, the OD gripper assembly is just below the carriage. The ID, inner surface, gripper assembly is inserted axially in the OD gripper assembly. To extract the tube portion from the header initially, the gripper of the ID gripper assembly is engaged with the internal surface of the tube portion. The gripper of the OD gripper assembly is engaged with the ID gripper assembly in the same way as it is engaged with the external surface of a tube portion. The piston rods are moved downwardly pulling the OD gripper and the ID gripper downwardly out of the header. The carriage is then moved downwardly collapsing the piston rods. Then the ID gripper is disengaged from the internal surface of the tube portion and the OD gripper is disengaged from the ID gripper assembly and engaged with tube portion. The OD gripper assembly is then moved downwardly by the piston rods. The alternate movements of the carriage and OD gripper assembly continues until the tube portion is pulled out to the predetermined length. Then the tube length is cut off by the tube-cutting apparatus, the carriage is raised and the pulling of the succeeding length of the portion is repeated. Typically the U-tubes are composed of INCONEL alloy or stainless steels. The abrasive wheel must be of material capable of cutting this alloy.

The complete tube portion removal system includes the following auxiliary components in addition to the tube portion pulling and cut-off apparatus described above:

(a) Viewing system or visual system/pan and tilt fixture;

(b) Hydraulic/pneumatic valve stand and booster box;
(c) Control console;
(d) Transducer console; and
(e) Tube removal tool.

These components are not disclosed in detail as they are auxiliaries not primarily involved in the invention although they are secondarily involved in its practice.

a. The visual system includes TV camera pan and tilt fixture; camera monitor and video-tape recorder. The function of this system is two-fold; one, to observe the tube pulling and cutting operations, and two, to identify the tube-support plate indications on the tube as it emerges from the header. A third supplementary function is to provide a visual record of the tube-pulling operation.

b. The valve stand includes a dolley on which are installed all equipment including hydraulic and pneumatic sources for driving the pistons in the cylinders which actuate the OD gripper assembly, the tube cutter, abrasive wheel, the control valves, pressure regulators and the like.

c. The control console is an electronic control box used to control remotely the tube portion pulling operations.

d. The transducer console serves the following purposes:

1. It provides a visual display of the positions of the ID and OD gripper assemblies and of the OD gripper.
2. It provides a visual display of each tube portion length or section extracted from the header.
3. It provides a facility for tracking support plate locations and indications of eddy currents produced by the probe.
4. It provides a means for limiting the length of tube lengths which can be extracted between cuts.
5. It provides a visual display of the pulling force exerted by the ID and OD gripper assemblies.
6. It provides a record of load versus length of each tube length extracted.
7. It provides a facility for limiting the load which can be applied to the pulling-apparatus power screws to the maximum allowable load.

BRIEF DESCRIPTION OF THE DRAWINGS

For a better understanding of this invention, both as to its organization as to its method of operation together with additional objects and advantages thereof, reference is made to the following description taken in connection with the accompanying drawings, in which:

FIG. 13 is a view partly in side elevation and partly in longitudinal section of the OD gripper;

FIG. 14 is a view in end elevation taken in the direction of the arrows XIV—XIV of FIG. 13;

FIG. 15 is a view in end elevation taken in the direction of the arrow XV—XV of FIG. 13;

FIG. 16 is a view in side elevation of a jaw of the OD gripper;

FIG. 17 is a view in end elevation taken in the direction of the arrows XVII—XVII of FIG. 16;

FIG. 18 is a view in longitudinal section of the actuator for the OD gripper;

FIG. 19 is a view in elevation taken in the direction of the arrows XIX—XIX of FIG. 18;

FIG. 20 is a view in longitudinal section of the insert which causes the gripping action of the OD gripper;

FIG. 21 is a view in end elevation of the OD gripper body;

FIG. 22 is a view in section taken along line XXII—XXII of FIG. 21;

FIG. 24 is a view in side elevation of the tube cutter;

FIG. 26 is a view in side elevation in the direction of the arrows XXVI—XXVI of FIG. 25 but with the cutter as shown in FIG. 25 rotated through 30° counterclockwise in the plane of the drawing;

DESCRIPTION OF THE PREFERRED EMBODIMENT

Figure 1:
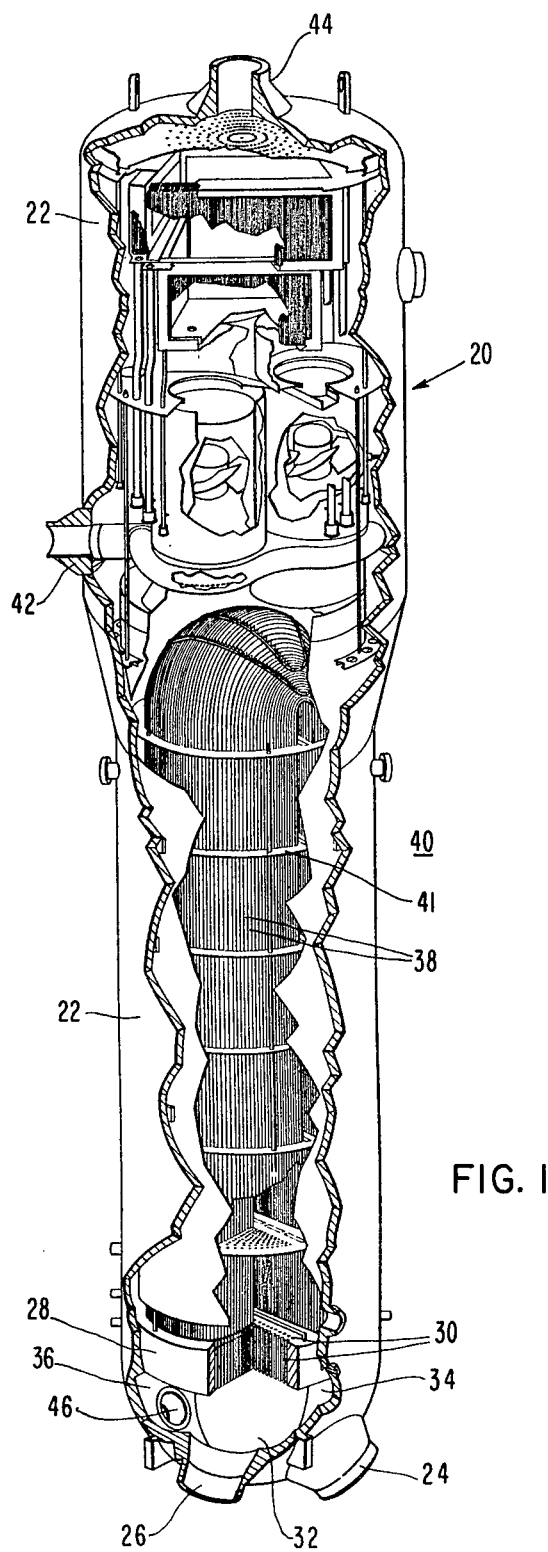
FIG. 1 is a view in side elevation, with a portion of the wall broken away, of a steam generator of the type that is involved in the practice of this invention.

The apparatus shown in FIG. 1 is a typical steam generator 20 to which this invention is applicable. This steam generator 20 is shown and described in detail in U.S. Pat. No. 4,231,690, granted Nov. 4, 1980, for "Tube Lock Drill Pool" to D. C. Burns and assigned to Westinghouse Electric Corporation. The labelling of the Burns is adhered to in FIG. 1 of this application. Only the aspects of the generator 20 involved in this invention will be described here.

The generator 20 includes a container 22 having an inlet 24 and an outlet 26. A header or tubesheet 28 having openings 30 is secured internally to the container 22 above the inlet and outlet 24 and 26. The space under header 28 is subdivided by a divider plate 32 into an inlet plenum 34 and an outlet plenum 36. The generator 20 includes a plurality of U-tubes 38 which are formed into an assembly 40. The U-tubes extend into the openings 30, each tube spanning the divider plate 32 and communicating between the inlet plenum 34 on one side of the divider 32 and the outlet plenum 36 on the opposite side of the divider 32. At their respective ends the U-tubes are seal welded to the lower surface of the header 28. The openings above inlet plenum 34 are sealed by the divider 32 from the openings in outlet plenum 36. The U-tubes are supported by a plurality of support plates 41 having holes through which the legs of the U-tubes pass. The hot coolant from the reactor flows into the U-tube legs which open in inlet plenum 34 and the cooled coolant flows back to the reactor through the U-tube legs which open in outlet plenum 36.

At times some of the U-tubes 38 develop leaks. On the occurrence of leaks the U-tube involved must be plugged promptly to minimize the radioactive contamination of the secondary system.

In the practice of this invention the U-tubes are probed with an eddy-current probe and those manifesting defects are cut off, typically at least three inches above or below the defect and at least three inches below the U-tube support 41 above the defect. In this application and its claims the severed part of a U-tube is referred to as a "portion of a tube" or "tube portion" to distinguish it from the U-tube or straight tube as a whole. The "tube portion" is identified by the label 50 shown in FIGS. 2 through 28.

Figure 2:
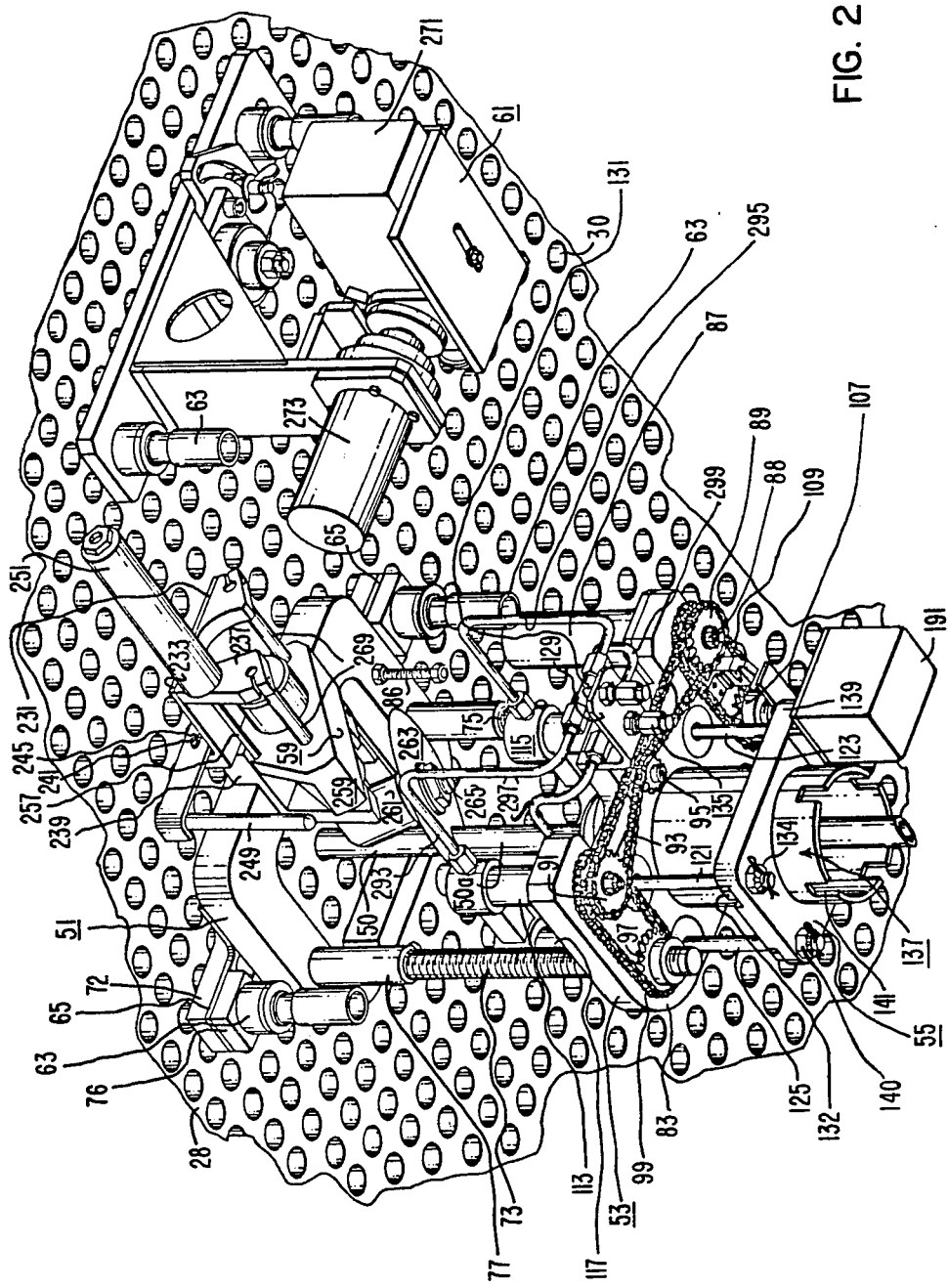
FIG. 2 is an isometric view of apparatus in accordance with this invention.
Figure 3:
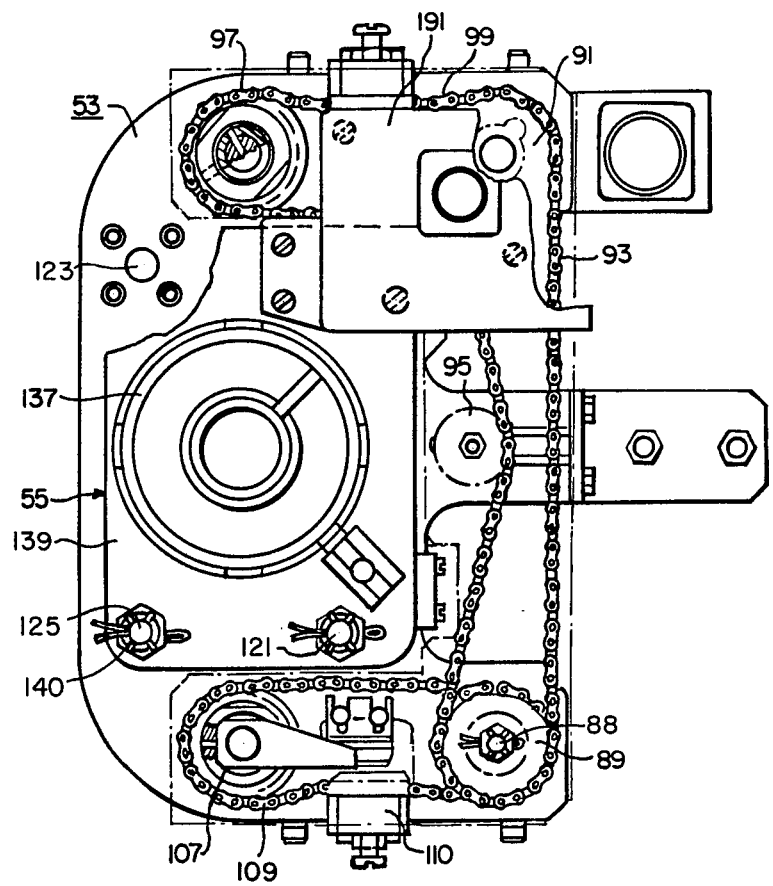
FIG. 3 is a plan view, as seen from below, showing the carriage and OD gripper assembly of the apparatus shown in FIG. 2.
Figure 11:
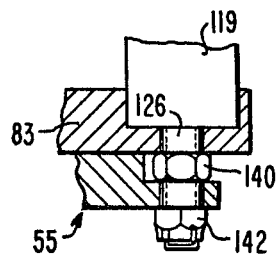
FIG. 11 is a fragmental view in section taken along line XI—XI of FIG. 7.
Figure 12:
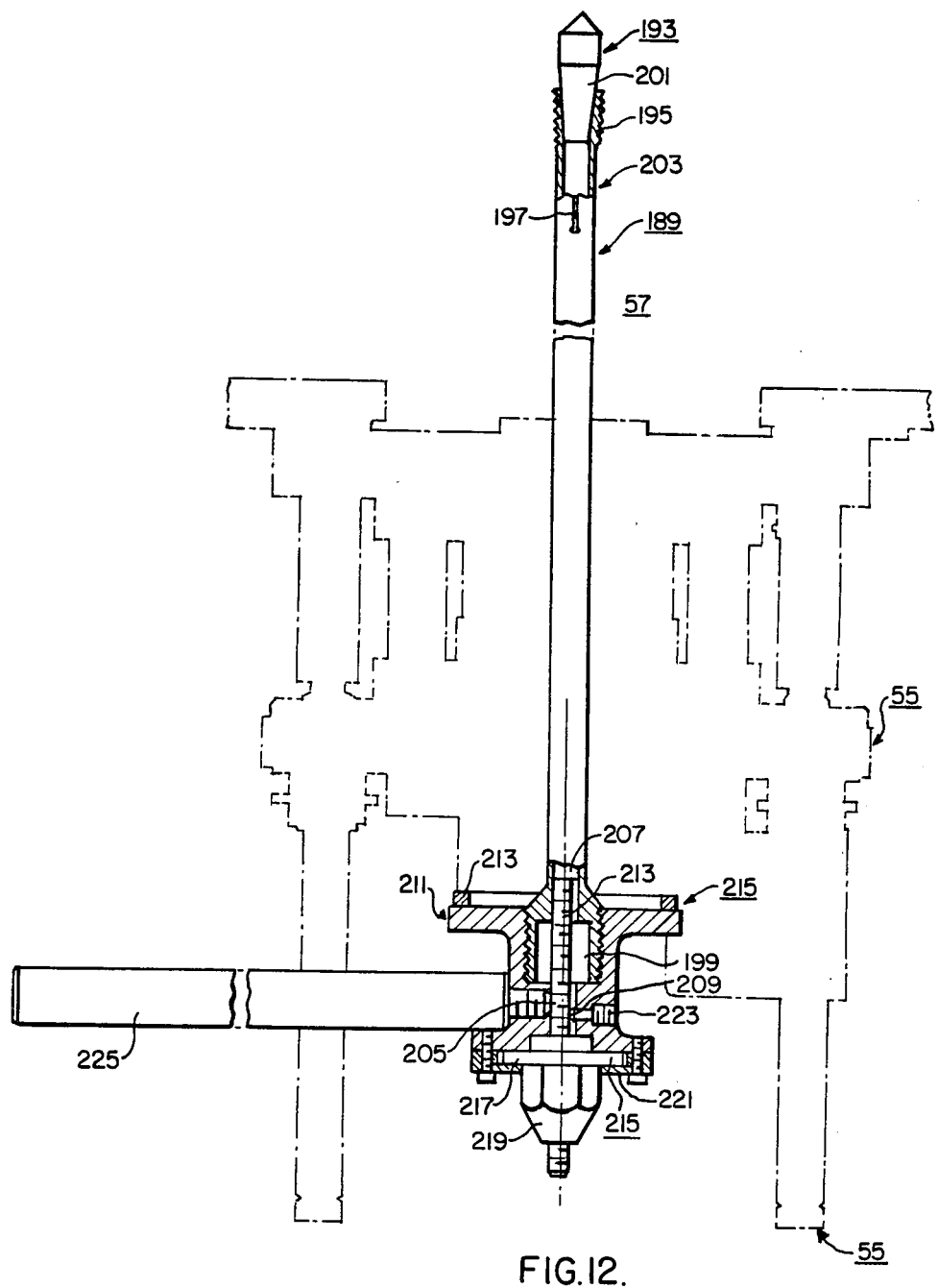
FIG. 12 is a view partly in side elevation and partly in section showing in heavy lines the ID gripper assembly and in light dash-dot lines the lower portion of the OD gripper assembly through which the ID gripper assembly is inserted.

The apparatus shown in FIGS. 2 through 28 serves to remove a tube portion 50 after it has been cut off above the defect and its weld to the header 28 has been machined off. This apparatus includes a base plate or base 51, a carriage 53, an OD gripper assembly 55 an ID gripper assembly 57, a tube cutter 59, and a TV viewing system 61 for closed-circuit viewing. FIG. 2 shows the apparatus in operation with a length 50a of the tube portion pulled out and in the process of being severed. The ID gripper assembly is not shown in FIG. 2; it is shown in FIG. 12. As shown in FIG. 2 the tube portion 50 is severed well below the hole 30 through which it extends. The succeeding length 50a of the tube portion can be pulled out without use of the ID gripper assembly.

The base 51 is in the form of a generally rectangular frame open in the middle to afford access to the hole 30 through which a tube portion 50 is to be removed. The base 51 is suspended from the header 28 by expanded mandrel locks or tube locks 63 on its opposite sides. Each lock 63 is provided with an adapter plate 65 which is secured to the upper face of the base 51. The spreader 67 (FIG. 4) of each lock 63 and the mandrel or gripper 68 into which it is movable for locking extends into the end of a U-tube appropriately located where the base 52 is to be mounted. By turning the shaft 70 the spreader 67 is pulled into the gripper 68 expanding the gripper so that it is locked to the U-tube 38. The shaft 70 has a bearing surface of square cross-section which engages a bearing in bearing plate 72. The plate 72 is urged into firm engagement with the header 28. The plate 72 has circular recesses 74 (FIG. 5) to accommodate the protruding ends of U-tubes 38 adjacent the tube into which the shaft 70 extends. The shaft 70 is provided with a housing 76.

Acme screws 73 and 75 (FIGS. 2, 4) are suspended from the base 51 by studs 77 and 79 securely bolted to the base 51. Expandable GORTITE protectors 81 (FIG. 4) protect the acme screws 73 from dirt which may be carried down with water from the header 28. A stop 80 (FIG. 9) is secured by a pin 82 to the bottom of screw 75. The stop 80 cooperates with microswitch 84 to limit the downward movement of the carriage 53. A screw 86 cooperates with a microswitch 90 to limit the upward movement of the carriage 53. The screw 86 is adjustable upwardly or downwardly.

Figure 7:
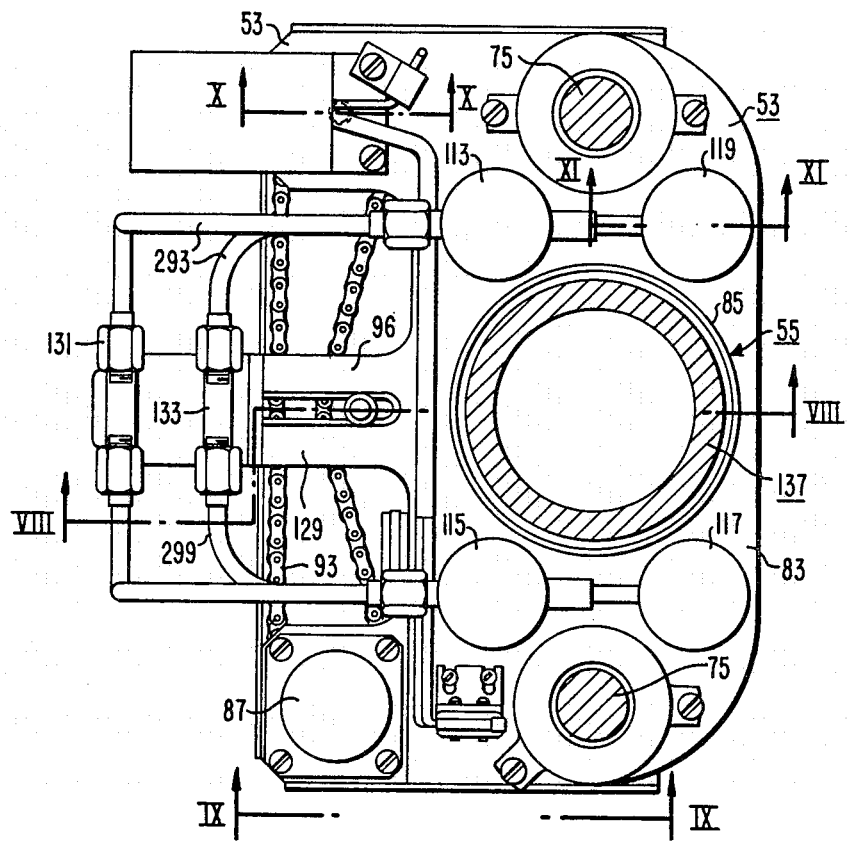
FIG. 7 is a view in section taken along line VII—VII of FIG. 4.
Figure 8:
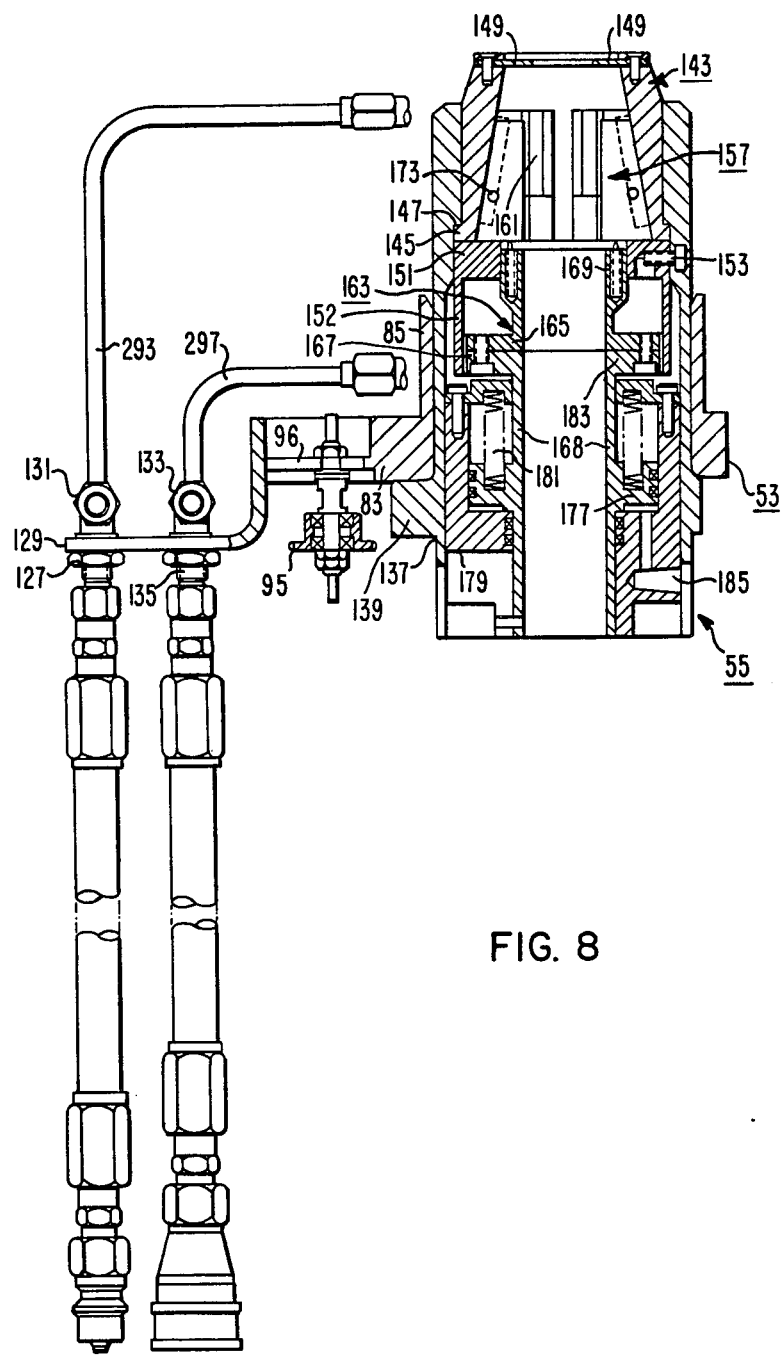
FIG. 8 is a view in section taken along line VIII—VIII of FIG. 7.
Figure 9:
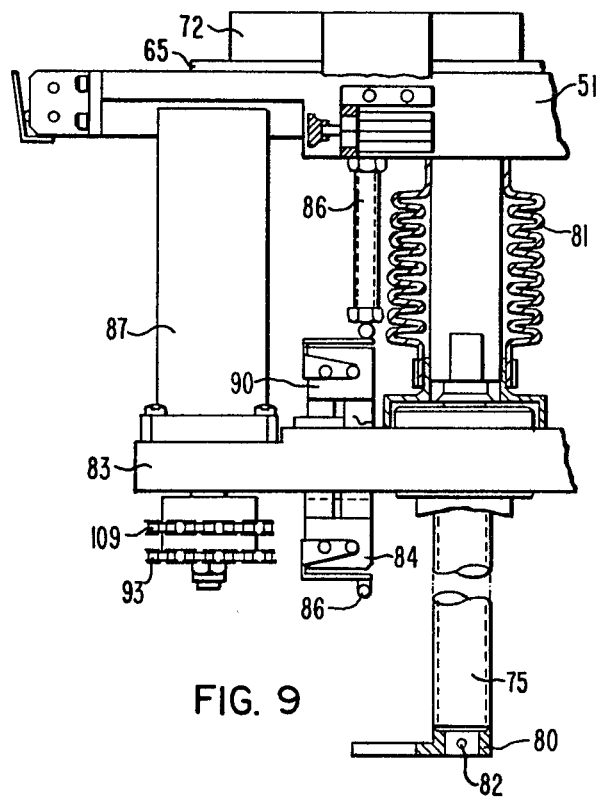
FIG. 9 is a fragmental view in end elevation taken in the direction of arrows IX—IX of FIG. 7.
Figure 10:
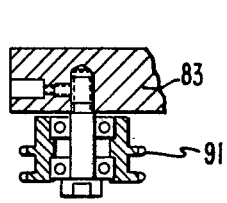
FIG. 10 is a fragmental view in section taken along line X—X of FIG. 7.

The carriage 53 includes a plate 83 having generally the form of a C in transverse section. A sleeve 85 (FIGS. 4, 8) extends through the web of the plate 83. A planetary-gear motor 87 is mounted near the end of one arm of the plate 83 (FIG. 9). The drive shaft 88 of the motor 87 passes through a bearing (not shown) in plate 83 and drives a sprocket wheel 89 and another (not shown) upwardly of the sprocket wheel 89. Sprocket wheel 89 drives an idler sprocket wheel 91 through a sprocket chain 93. The chain 93 is tensioned by a sprocket wheel 95 adjustably mounted on bracket 96 (FIG. 7). A sprocket wheel (not shown) coaxial with sprocket wheel 91 drives a sprocket wheel 97 through chain 99. Sprocket wheel 97 drives drive nut 101 (FIG. 4) which meshes with acme screw 73. Nut 101 is rotatable on circumferential ball bearing 103 and on thrust bearing 105. Bearing 105 takes up the thrust of screw 73. The other sprocket wheel (not shown) coaxial with sprocket wheel 89 drives a sprocket wheel 107 through sprocket chain 109. Sprocket chain 109 is tensioned by a block 110 of NYLON composition. Sprocket wheel 107 drives a drive nut 111, similar to nut 101 and similarly journaled. Drive nut 111 meshes with acme screw 75. As the drive nuts 101 and 111 are rotated in one direction or the other, the carriage 53 is moved upwardly or downwardly on screws 73 and 75.

Figure 5:
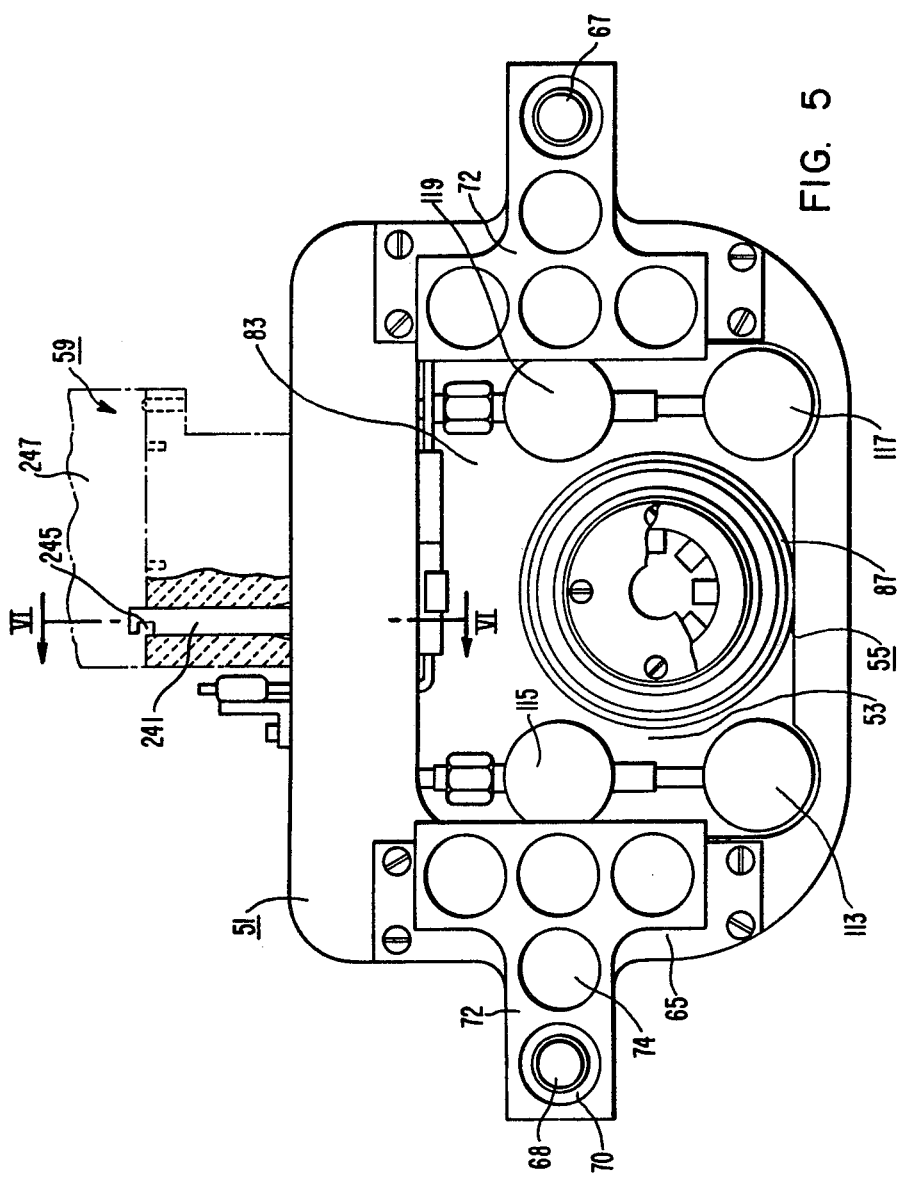
FIG. 5 is a plan view, as seen from above, of the apparatus shown in FIG. 2.
Figure 29:
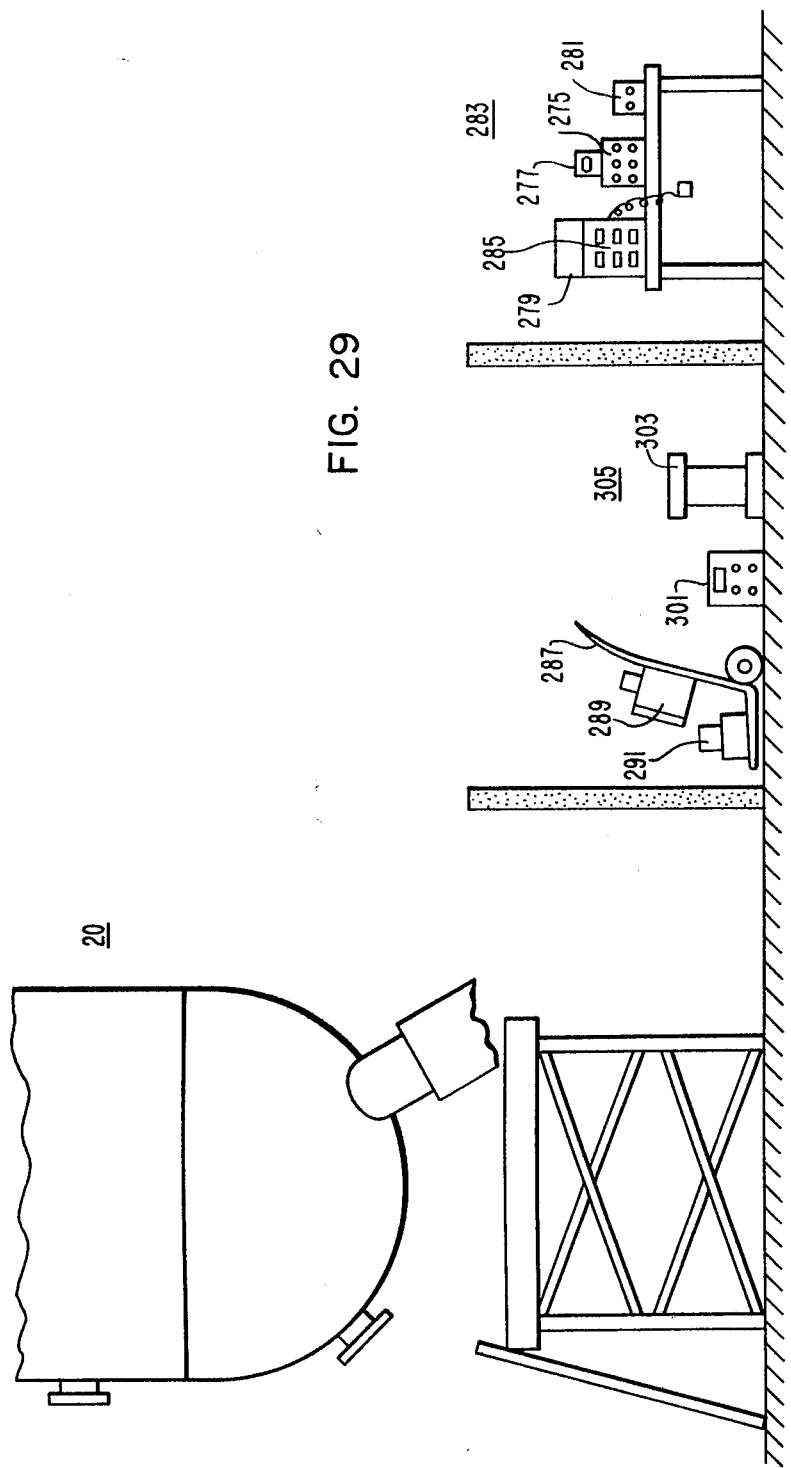
FIG. 29 is a diagram showing the facilities for installing and controlling the apparatus according to this invention.

A plurality of hydraulic cylinders 113, 115, 117 and 119 are mounted on plate 83 (FIGS. 1, 5, 7). Each cylinder has a piston rod 121, 123, 125 (FIGS. 2, 3, 23A, 23B, 23C), and 126 (FIG. 11). Each piston rod is moved vertically downwardly and upwardly under the action of a piston (not shown) in its cylinder. Fluid is supplied to the cylinders 113-119 above their respective pistons from a source of fluid (303, FIG. 29) through inlet nipple 127 (FIG. 8) which is mounted on bracket 129 suspended from plate 83. Nipple 127 is connected to the cylinders on both sides of the nipple 127 through a T-joint 131. Fluid under the pistons is returned to the source through T-joint 133 and nipple 135 also mounted on bracket 129.

The OD gripper assembly 55 (FIGS. 2, 8) includes a gripper body 137 in the form of a sleeve having a rectangular flange 139 below its center. The gripper body is mounted slidably within the sleeve 85 of the carriage plate 83. In the uppermost position of the gripper body 137, its flange 139 engages the under-surface of the plate 83 as shown in FIG. 8. There are holes 134 (FIG. 2) in the four corners of the flange where the piston rods 121, 123, 125 and 126 are engaged. Each piston rod is threaded at the end and secured to the flange 139 by nuts 140. Below the flange 139 the gripper body 137 is in the form of a skirt with slots 141 (FIG. 2) where the ID gripper assembly 57 (FIG. 12) is engaged. An insert 143 (FIG. 8) is mounted in the upper portion of the gripper body 137. Externally the insert 143 is generally cylindrical to conform to the inner cylindrical surface of the gripper body. The insert 143 has a flange 145 which engages an internal shoulder 147 in the gripper body 137. Internally, the insert is tapered, its surface defining a frustrum of a cone. A ring 149 is secured over the upper opening in the insert.

A guide 151, generally in the form of a flat annulus from which a cylindrical skirt 152 extends, is mounted in engagement with the base of the insert 143 and the internal wall of the gripper body 137. The guide 151 is secured in the gripper body 137 by set screws 153 through countersunk bores 155 (FIG. 22).

The OD gripper assembly 55 includes an OD gripper jaw assembly 157. The gripper jaw assembly 157 includes a cylindrical guide 159 from which fingers 161 extend upwardly (FIGS. 13, 14). The OD gripper jaw assembly also includes an actuator 163 (FIGS. 18, 19). The actuator 163 is in the form of a hollow cylinder from whose base equally spaced tabs 165 extend. The tabs 165 are bolted to flange 183 of the sleeve 168. Spring plungers 169 are equally spaced around the periphery of the actuator 163.

The OD gripper jaw assembly 157 includes jaws 171 (FIGS. 15, 16). Each jaw 171 in longitudinal section has the form of one-half of a trapezoid. Below the center and near the sloping side, each jaw 171 is penetrated by a pin 173. Each finger 161 of the OD gripper jaw assembly 157 includes oppositely disposed slots 175. The jaws 171 are secured between opposite fingers 161 by the pins 173 (FIG. 14).

The actuator 163 and jaw assembly are moved upwardly by the piston 177 (FIG. 8) of an air cylinder 179 against the force of a compression spring 181. The piston 177 is integral with sleeve 168 having the flange 183 at the top which engages the actuator 163. The air for raising the piston 177 is injected into the air channel 185 of the cylinder through an opening 187 (FIG. 22) in the gripper body 137. When the jaw assembly 157 is urged upwardly the fingers 161, being of resilient metal, are converged by the insert 143 converging the jaws 171 so that they firmly engage the tube section 50 or the spreader housing 189 of the ID gripper 57 (FIG. 12) as the case may be. When the air through channel 185 is exhausted the OD gripper jaw assembly 157 is retracted and the fingers 161 and jaws 171 are returned to their retracted disengaged setting.

A displacement transducer 191 (FIGS. 2, 3) is mounted on the plate 139 of the OD gripper assembly 55. The displacement transducer 191 provides facilities for determining true carriage position, total length of tube portion 50 extracted and length of tube lengths or tube sections 50a extracted between cuts. The transducer 191 is of the cable type. As the OD gripper assembly 55 is moved, a wire (not shown) is pulled out of the transducer, turning an encoder (not shown). The encoder in turn feeds a signal identifying the lengths of the tube portions 50 pulled out, the tube lengths cut-off and the total length of tube portion pulled out. The displacement transducer 191 is bought from Celesco Industries, Inc., Canoga Park, Calif.

The ID gripper assembly 53 (FIG. 12) includes in addition to the spreader housing 189, a spreader assembly 193. The spreader housing 189 is a tube thickened below the top and tapering internally from the thickened ring 195 to a sharp rim 196. The spreader housing 189 has a plurality of equally spaced slots 197 at the top. At the bottom the spreader housing flares out into an inverted cup-shaped stem 199. The stem is externally threaded. At the lower end, the spreader assembly 189 has a threaded stem 205 of somewhat smaller diameter than the central portion 207 of the assembly. The stem 205 has a flat surface 209 along at least a portion of its length. The spreader assembly 193 is a bar tapered at the top into a cylindrical head which has a point at the end. The tapered portion 201 is seated in the slotted end 203 of the spreader housing 189.

Figure 4:
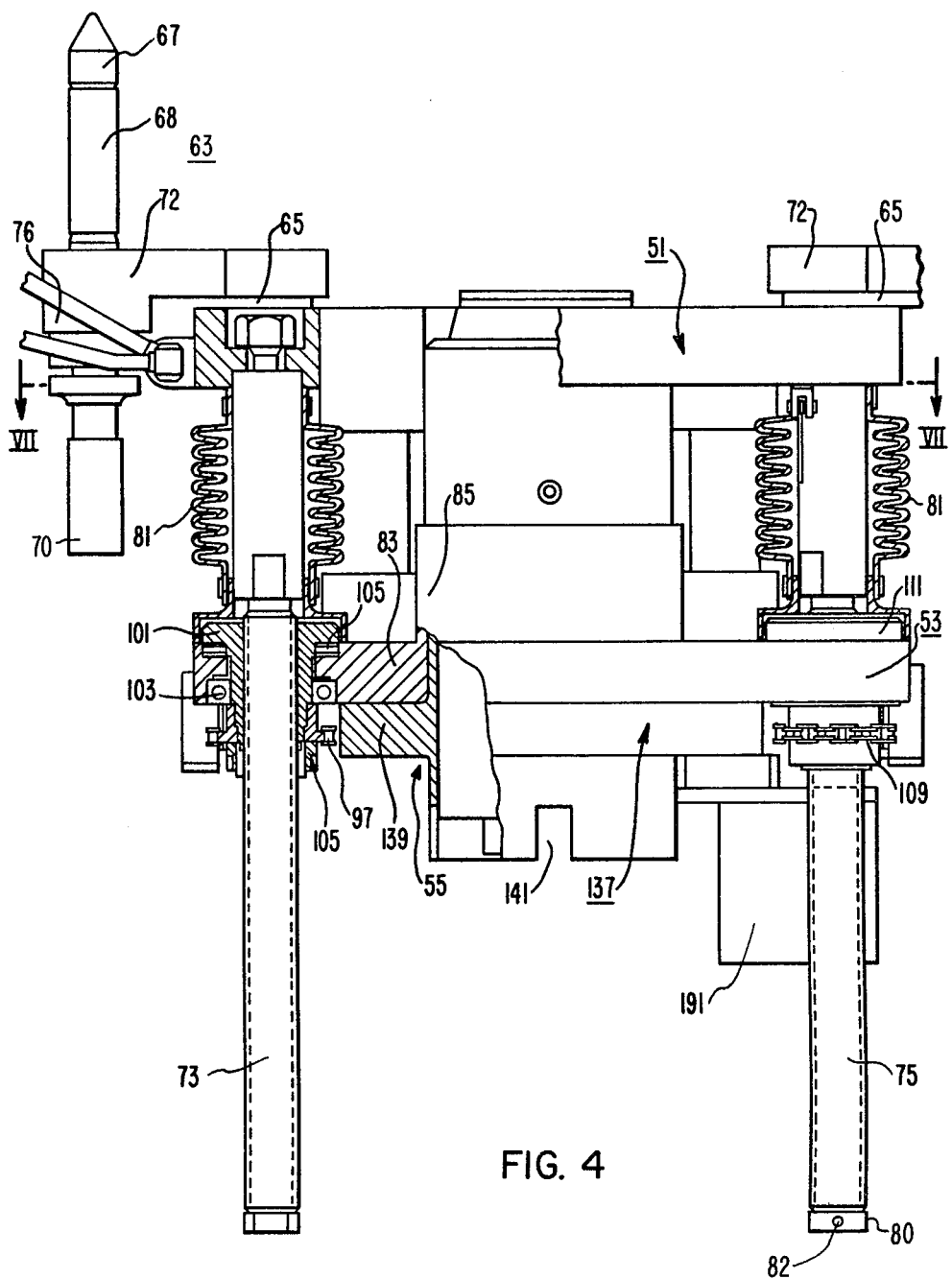
FIG. 4 is a view in side elevation of the apparatus shown in FIG. 2, exclusive of the tube cutter.
Figure 6:
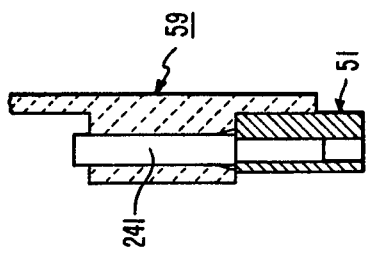
FIG. 6 is a fragmental view in section taken along line VI—VI of FIG. 5 showing the manner in which the tube cutter is supported from the base.

The ID gripper assembly 53 also includes a support hub 211. The support hub 211 has an internally threaded recess into which the cup-shaped stem 199 of the spreader housing is secured. Blocks 213 are welded equally spaced to the top of the hub 211. When the ID gripper assembly 57 is in use, the blocks 213 mate with the slots 141 in the skirt of the OD gripper body 137 (FIGS. 2, 4).

A cylindrical adapter 215 is mounted on the bottom of the support hub 211. The adapter 215 includes an annular disc 217 and a nut 219. The disc is held at the end of the hub 211 by a hub ring 221 bolted to the hub. The nut 219 is screwed onto the end of the stem 211. A locking pin 223 is screwed into a lateral hole in the hub. The tip of the pin 223 engages the flat surface 209 of the stem 211 preventing the spreader assembly from turning when the nut 219 is screwed onto the spreader assembly 193. By tightening the nut, the tapered portion 201 of the spreader assembly 193 moves downwardly causing the slotted end of the spreader housing 189 to expand outwardly and to grip a tube portion 50 internally. A handle 225 is screwed into another lateral hole of the hub 211 to prevent the hub from turning when the nut 219 is tightened.

Usually the ID gripper assembly 57 is operated manually because it is used only once at the start of the removal of a tube portion 50 from a steam generator 20. At the start of a removal operation the ID gripper assembly is inserted coaxially in the OD gripper assembly 53 with the blocks 213 in engagement with the slots 141. The tops of the spreader assembly 193 and of the spreader housing 189 extend into the end of the tube portion 50 within header 28. With the hub 215 and the parts attached to it prevented from turning by the handle 225, the nut 219 is tightened with a wrench causing the top 203 to grip the inner surface of the end of the tube portion 50. The outer surface of the spreader housing is then gripped by the jaws 171 of OD gripper 157 and the OD gripper assembly 53 is operated to pull out a length 50a of the tube portion 50. This operation is by remote control. The tube length 50a is then cut off below the bottom of the header 28 as shown in FIG. 2. Successive tube lengths may now be pulled out and cut off, without the aid of the ID gripper assembly 57, by remote control.

Figure 23A:
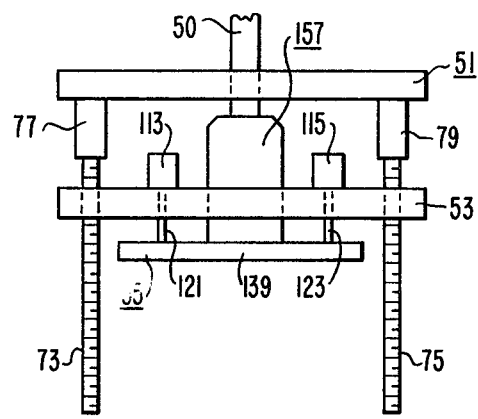
FIGS. 23A, 23B, and 23C are generally diagrammatic views showing the relative positions of the carriage and OD gripper assembly of the apparatus shown in FIG. 2 during a sequence of operations.
Figure 23B:
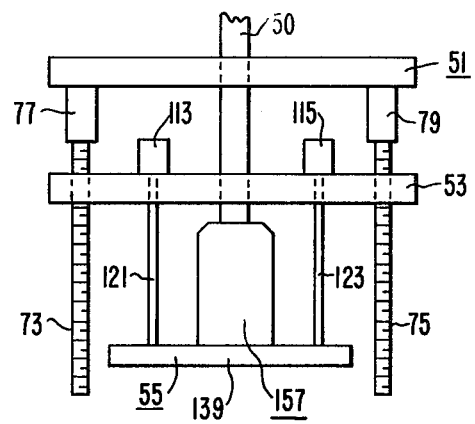
Figure 23C:
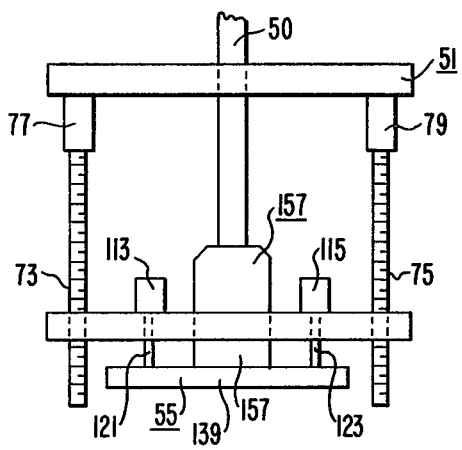

The manner in which the carriage 53 and the OD gripper assembly 55 cooperate to pull out each length 50a of the tube portion 50 will now be described with reference to FIGS. 23A, 23B and 23C. Initially the carriage 53 and the OD gripper assembly 55 are in the positions shown in FIG. 23A with the piston rods 121–126 retracted into cylinders 113–119 and the gripper flange 139 adjacent to or abutting the carriage 53. The OD gripper 157 is engaged with the tube 50 (or at the start with the ID gripper housing 189). Fluid is injected into cylinders 113–119 to move the piston rods 121–126 downwardly. The rods carry the OD gripper assembly downwardly and the gripped tube portion 50 is pulled out of the header 28 (FIG. 2) a distance equal to the movement of the piston rods 121–126, which typically may be about three inches. The apparatus is now as shown in FIG. 23B with the piston rods 121–126 extended. Next motor 87 (FIGS. 2, 9) is energized rotating screws 73, 75, moving carriage 53 downwardly and collapsing rods 121-126 into the cylinders 113-119. During this stage of the operation, the tube portion 50 is not pulled out of the header 28. The carriage 53 and OD gripper assembly 55 are now in the positions shown in FIG. 23C. If desired, the movement of the carriage 53 and, with the carriage, the OD gripper assembly 55 may continue to a position below the last low position of the OD gripper assembly and the tube pulled out correspondingly. In any event the above described alternate operations of the OD gripper assembly 55 and of the carriage 53 continue until the length of tube 50a which the space permits is pulled out. This length is cut off by the tube cutter 59. Then the carriage 53 and gripper assembly 55 are raised to the uppermost position and the pulling steps repeated. The above-described pulling operation by alternate movement of the carriage 53 and OD gripper assembly 55 is carried out by remote control. The cooperation of the motor driven carriage 53 and the OD gripper assembly 55 actuated by the hydraulic cylinders 113-119 permits engagement of the tube portion 50 at wider increments than would be feasible with a cylinder-driven OD gripper assembly alone. Damage to or marking of the outside surface of the tube portion 50 is thus minimized.

Figure 27:
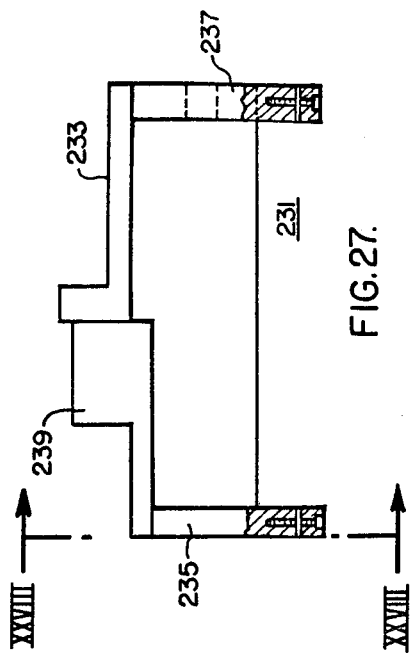
FIG. 27 is a view in side elevation and partly in section of the supporting bracket assembly for the tube cutter.
Figure 25:
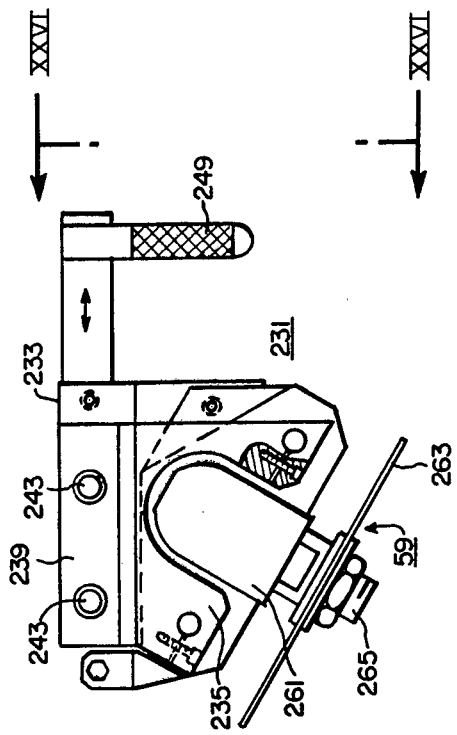
FIG. 25 is a view in end elevation of the tube cutter.
Figure 28:
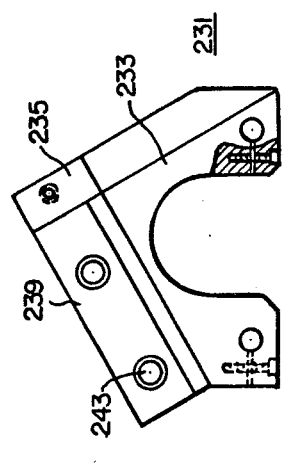
FIG. 28 is a view in end elevation and partly in section taken in the direction of the arrows XXVIII—XXVIII of FIG. 27.

The tube cutter 59 which will now be described is shown in FIGS. 2 and 24 through 28. This tube cutter includes a bracket assembly 231 formed of a bracket 233 and supports 235 and 237 secured together as shown in FIGS. 27 and 28. A member 239 for connecting the tube cutter 59 to the base 51 is secured to the bracket 233 and support 235. Rods 241 (FIGS. 5, 6, 24) extending from the base 51 pass through openings 243 in the foot-like end of the member 239. These rods 241 are secured bayonette fashion to the bracket assembly 231 in projections 245 of a latch 247. To secure the rods 241 the latch 245 is moved by handle 249 so that the rods 241 engage the notches 245.

A cylinder 251 driven by air over oil is supported from the support 237. Conductor 253 is connected to the end of cylinder 251 and conductor 255 is connected laterally near the opposite end of the cylinder. The cylinder has a piston rod 257 actuable by its piston (not shown). Air supplied to conductor 253 moves the rod 257 out of the cylinder 251, to the left in FIG. 26, and air supplied to conductor 255 retracts the rod 257 into the cylinder, to the right in FIG. 26. A carrier 259 is connected to the piston rod 257. An air motor 261 is connected to the carrier 259. An abrasive disc 263 typically of fiberglass-reinforced aluminum oxide is mounted on the shaft 265 of the motor. The carrier 259 is mounted slidably on ball bushings 267 on guide rods 269 (FIGS. 2, 26) which extend between the supports 235 and 237.

Typically the disc 263 is a five-inch diameter, fiberglass-reinforced, aluminum oxide disc. The air motor 261 is driven at about 9,000 to 11,000 RPM. The plane of the disc 263 is tiled about 30° to the axis, upwardly from the disc, of the tube portion 50 being cut and 150° downwardly from the disc as shown in FIG. 2. With the ends of the cut lengths marked, the tube portion can later be reconstructed for investigation as it was originally. The cylinder 251 which drives the disc 263 through the tube portion 50 is typically a bimba cylinder driven by an air-over-oil system. By controlling oil-flow rate and pressure, cutter feed force and speed are controlled. The tube cutter 59 is operated by remote control. A microswitch (not shown) located on the base 51 activates a "cut complete" light on the control console 275 (FIG. 29) when a tube length 50a has been severed.

The TV viewing system 61 (FIG. 2) is sometimes referred to as a TV pan-and-tilt fixture and is largely conventional. The TV pan-and-tilt fixture 61 is cam-locked to the header 28 in the vicinity of the pulling apparatus (approximately one foot back looking into the pulling apparatus at a 45 degree angle). The fixture 61 is manually panned (targeted on the pulling apparatus) and locked into place. Camera focus is adjusted manually. Light intensity is adjusted at the remote control console. The fixture includes a camera 271 which is swung vertically by a motor 273. It is capable of scanning up and down 35 degrees off of horizontal. Microswitches (not shown) limit tilting capability. Tilting is controlled at the control console 275 (FIG. 29) via up and down switches. A TV monitor 277 located in the vicinity of the control console 275 allows the operator to observe tube pulling operations. A video tape recorder 279 located in the vicinity of the control console allows the operator to tape all or part of the tube pulling operations. The control console 275 together with a monitor 277, a tape recorder 279, and the audio box 281 and a transducer console 285 are in a containment 283 protected from radiation.

The control console 257 serves to control the operation of the tube pulling apparatus, abrasive tube cutter 59, pan and tilt fixture 61, lighting, and hydraulic pump. Each of the concerned functions has a corresponding switch located on the control console. Actuation of any one switch triggers desired mechanical or electrical behavior (opening and closing of solenoid valves or closing of valves or closing of electrical circuits). Also, logic is built into the control circuit to prevent undesired situations from occurring. This is accomplished by logic which requires certain conditions be in effect before operation of particular functions can occur and/or sequencing the order of switch activation.

In addition to the above-mentioned switches, indicator lights activate when certain conditions are in effect. These include:
 a. Main power on.
 b. Hydraulic pump on.
 c. Cutter air motor 261 on.
 d. Carriage 53 in upper limit position.
 e. Carriage 53 in down limit position.
 f. Carriage 53 and OD gripper assembly 55 in contact.
 g. OD gripper 175 engaged.
 h. OD gripper 157 disengaged.
 i. Cut complete.

The features described provide the capability for extracting a tube portion 50 from a steam generator with fully remote control except for the ID gripper assembly operation. Theoretically, the operator can control the system even without visual confirmation. However, the visual system 61 is included part of the component package.

The upper digital display on the transducer console 285 monitors true gripper position. The displacement transducer 191 on the pulling apparatus feeds a bi-directional signal to the display which indicates where the OD gripper 157 is in relation to the pulling apparatus. A reset switch (not shown) next to the display allows one to zero at any desired position. However, the zero point in this system corresponds to the upper limit position of the carriage 53. A thumbscrew dial (not shown) and preset button (not shown) adjacent to the display also allows one to preset any desired number on the display up to 999.999 inches.

The lower digital display on the transducer console 285 monitors total length of tube portion 50 extracted from the steam generator feeder 28. The displacement transducer 191 on the pulling apparatus feeds a unidirectional summing signal to the display which indicates that tube portion 50 is being pulled and by how much. The signal is fed only when the OD gripper 157 is engaged on a tube portion and the tube pull switch has been activated. A reset switch (not shown) next to the display allows one to zero the display. This will occur only once, prior to starting the pull. Once the display is zeroed, the reset switch is enclosed in the cover. This will prevent the inadvertent zeroing of the display after the pull has begun. A thumbscrew dial limit switch (not shown) adjacent to the display allows one to dial in the position of a support plate or eddy current indication. If the value on the display equals the value on the dial, the tube pull switch (not shown) will deactivate not allowing one to pull more tube until the limit is reset and the dial advanced to a greater value. The dial when used in concurrence with the preset button (not shown) also allows one to preset any desired number on the display (up to 999.999"). However, the preset switch should always be covered while pulling and should be used only in the event of loss of power to the transducer console 285.

A second thumbscrew (not shown) dial limit switch located on the lower half of the transducer console 285 allows one to dial in the maximum value at which a cut should be made. This limit switch functions like the aforementioned thumbscrew dial limit switch except that it cannot be used to preset numbers on the total tube pulled display.

A pressure/force meter (not shown) located on the lower half of the transducer console 285 provides a visual display of pulling pressure in thousands of psi and pulling force in thousands of pounds.

A strip chart recorder (not shown) located on the lower half of the transducer console 285 provides a record of pulling load versus length of tube extracted. The horizontal scale (not shown) plots pulling force (full scale corresponds to 5,000 psi) while a vertical tick marker provides a mark for every inch of tube portion 50 pulled. The recorder automatically turns on when tube portion 50 is being pulled and automatically shuts down when one stops pulling the tube portion.

The "buckling system" is designed to prevent the inadvertent buckling of the carriage drive screws 73 and 75 under load. An electronic circuit inside the transducer console 285 constantly divides actual applied load by true carriage position obtaining a ratio called the "buckling ratio". As long as the buckling ratio is less than a value called the "Critical Buckling Ratio", the tube pulling apparatus remains operational. If the critical buckling ratio is reached, the tube pull switch (not shown) automatically deactivates (thus relieving load). To continue operation, the OD gripper 157 must be moved up and the buckling system reset.

The valve stand is a dolley 287 (FIG. 29) on which is fixed a valve box 289 and hydraulic pump 291. The valve box 289 contains solenoid valves, pressure gages, air over oil tanks and flow control valves (all not shown). These items serve to control remotely the OD gripper assembly 55, air motor 261, cutter 61 and auxiliary functions. All circuits are low pressure (0–90 psi) pneumatics or air over oil. The box 289 is constructed for ready access to components for purposes of repair or adjustment. The box can also be quickly removed from the dolley for transporting manually. The hydraulic pump 291 supplies high pressure oil to the tube pulling apparatus hydraulic cylinders 113–119. A solenoid valve (not shown) mounted on the pump assembly directs the oil into the desired line. A pressure relief valve (not shown) allows one to set pressure values to limit build-up of pressure in the system. When pulling a tube portion 50 with the pulling apparatus, certain steps are followed which enable gripping the tube at 9 and 15 inch intervals (depending on which set of acme screws are employed). Basically these steps are:

a. Engage OD gripper 157 on tube portion 50.
b. Stroke cylinders 113–119.
c. Drive carriage 53 down until carriage and OD gripper assembly plate 139 contact.
d. Stroke cylinders 113–119.
e. Drive carriage down until carriage and OD gripper plate 139 contact.
f. Etc.

When driving the carriage 53 down against the OD gripper assembly plate 139, the hydraulic cylinder rods 121–126 are in effect retracted using the carriage drive motor 87. In so doing, hydraulic fluid in the lines 293, 295, 297, 299 is displaced. The carriage drive motor 87 does not have the capability to displace this fluid. For this reason, a special hydraulic circuit (not shown) located in the booster box 301 is employed. Thus, when driving the carriage 53 downward, a force is applied to the retract side of the hydraulic cylinders 113–119 equal to the required force necessary to displace the pistons in the cylinders 113–119. In compensating for the above-described condition, another unwanted situation is created which must be resolved. A force applied to the retract side of the hydraulic cylinders 113–119 has the effect disengaging the OD gripper 157, and the gripper must be engaged to operate the apparatus as described above. To compensate for the force which is tending to disengage the OD gripper 157, the pressure applied to the OD gripper actuator 163 must be increased accordingly. This force is applied by cylinder 179 (FIG. 8).

The dolley 287 and its components, the booster box 301 and an air over oil tank 303 are disposed in a containment 305 protected against radioactivity.

The ID gripper assembly 57 is used predominately to extract the tube portion 50 from the header 28. It could also be used to pull the tube portion out but for this purpose, the OD gripper assembly 55 is preferred. To initially extract the tube portion 50, the tube pull switch (not shown) at the control console 275 is actuated transmitting load from the OD gripper assembly 55 to the ID gripper assembly 57.

A tube removal tool is used in the practice of this invention to remove the tube lengths 50a as they are severed. This tool is only incidental to the practice of the invention and for this reason will be described here generally.

The tube removal tool is a multi-section telescoping tool at one end of which is attached a pneumatically operated tube gripper. Bimba air cylinders are employed to open and close the gripper. The cylinders are fed from an air line, which is connected to a miniature 3-way toggle switch-type valve located at the opposing end of the tool. The attitude of the gripper head can be adjusted by turning a handle located below the 3-way valve. Turning the handle pulls or pushes on a bimba cylinder rod. This action displaces fluid in a line connected to an identical bimba cylinder which controls the attitude of the gripper head. The second cylinder duplicates the displacement of the first cylinder exactly, thus changing the angle on the gripper head. The two cylinders constitute a master-slave system. Three, four foot length, concentric aluminum tubes allow one to telescope the tool to a distance of approximately ten feet. Nylon bushings located on the far ends of the two larger aluminum tubes allow one to adjust sliding friction between tubes. The tube-length-removal gripper head itself is lined with rubber to prevent marring or scarring of the concerned tube section. Tool operation is as follows: The tool is telescoped through the manway until the gripper head is in close proximity to the tube. The attitude of the gripper head is adjusted until it is perpendicular to the tube. The gripper is seated on the tube and closed using the 3-way air valve. The tube section is pulled down until it is completely free from the pulling fixture OD gripper assembly 55. The attitude of the tube removal gripper head is readjusted until the tube section is parallel to the tube removal tool. The tool is then retracted through the manway and tube section removed and marked for identification purposes.

A feature which is of interest is the cooperative operation in the practice of this invention of the ID gripper assembly 57 and the OD gripper assembly 55. The ID gripper assembly is operated manually locally only at the start of removal of a tube portion 50 from the header 28. Thereafter the OD gripper assembly is operated by remote control to remove the tube portion completely. Initially the nut 219 (FIG. 12) of the ID gripper assembly 57 is tightened manually so that the gripper 184 grips the internal surface of the tube portion. The tube portion is pulled out of the header 28 by action of the ID gripper assembly 57. Thereafter the operation is fully by remote control. The OD gripper assembly is actuated remotely by selective remote operation of the motor 87 (FIG. 2), the cylinders 113, 115, 117, 119, cylinder 259 and cylinder 251 and motor 261 of tube cutter 59. Each length 50a is cut off below the header so that the outer surfaces of the remaining lengths can be gripped by the OD gripper jaw assembly 157 (FIG. 8). The exposure to radioactivity is limited to the personnel which tighten the nut 219 and the duration of this exposure is very short.

While preferred embodiments of the invention have been disclosed herein, many modifications thereof are possible. This invention should not be restricted except insofar as is necessitated by the spirit of the prior art.

We claim:

1. Apparatus for removing portions of tubes from a steam generator of a nuclear reactor, said steam generator including a header having openings into which said tubes extend from within said generator, the said apparatus including a base plate, means securing said base plate to the face of said header opposite to the face from which said tubes extend, the said base plate being secured at a location of said header where a portion of a tube to be removed is readily accessible, a carriage suspended from said base plate movable towards and away from said base plate, means connected to said carriage, for moving said carriage away from and towards said base plate, gripper means for gripping the external surface of the portion of the tube to be removed suspended from said carriage, movable away from and towards said carriage, said gripper means including a gripper and mechanism for actuating said gripper to engage and be disengaged from the outside surface of said portion to be removed, and means connected to said external-surface gripper means for moving said external-surface gripper means away from and towards said carriage.

2. The apparatus of claim 1 wherein the base plate is in the form of a frame having an open region bounded by sides of the base plate, whereby the base plate may be secured to the header so that the portion of the tube to be removed is accessible through said open region.

3. The apparatus of claim 1 for a generator whose tubes enter the header generally perpendicular to the header wherein the external-surface gripper means is moved by the moving means for said external-surface gripper means in a direction generally perpendicular to the header.

4. The apparatus of claim 3 wherein the carriage is moved by the carriage-moving means in a direction generally perpendicular to the header.

5. The apparatus of claim 1 wherein the moving means for the external-surface gripper means includes fluid-cylinder drive means mounted on said carriage, said drive means having piston-rod means connected to said external-surface gripper means for moving said gripper means away from and towards said carriage.

6. The apparatus of claim 1 including gripper means for gripping the internal surface of the portion of the tube to be removed, to remove said portion from the header, and means for securing said internal-surface gripper means within said external-surface gripper means, so that on actuation of the external-surface gripper means to move away from the carriage said portion is moved out of said header.

7. The apparatus of claim 6 wherein the internal-surface gripper means is secured in the external-surface gripper means by the external-surface gripper and said external-surface gripper is actuated by the engaging and disengaging mechanism to engage the internal-surface gripper means in generally the same way as said external-surface gripper engages the outside surface of a tube to be removed.

8. Apparatus for removing portions of tubes from a steam generator of a nuclear reactor, said steam generator including a header having openings into which said tubes extend from within said generator, the said apparatus including gripper means for gripping the internal surface of the portion of a tube to be removed, the said internal-surface gripper means including a first gripper, means, connected to said first gripper for actuating said first gripper to engage the internal surface of said portion of a tube to be removed from said generator, gripper means for gripping the external surface of the portion of a tube to be removed, the said external-surface gripper means including a second gripper, means connected to said second gripper, for actuating said second gripper to engage the external surface of said portion to be removed, and means, connected to said internal-surface gripper means and to said external-surface gripper means for actuating said internal-surface gripper means to pull said portion to be removed out of said header while said first gripper is engaged with the internal surface of said portion and for actuating said external-surface gripper means to pull said portion to be removed a predetermined distance out of said header while said second gripper is engaged with the external surface of said portion.

9. The apparatus of claim 8 wherein the pulling means is common to the internal-surface gripper means and to the external-surface gripper means.

10. The apparatus of claim 8 wherein the means for actuating the internal-surface gripper means to pull the portion of the tube out of the header includes the second gripper, said second gripper being actuated to engage the internal-surface gripper means by the means for actuating the second gripper to engage the external surface of said portion.

11. Apparatus for removing portions of tubes from a steam generator of a nuclear reactor, said steam generator including a header into which said tubes extends means suspended from said header for pulling a portion of a tube to be removed from said header, and means, also suspended from said header, for severing said portion from the remainder of said tube, the said severing means including a cutting wheel disposed so as to cut said portion from said tube at an angle whereby when a plurality of portions of a tube are pulled out and severed, the formation of the length of the tube by the joining of said tube portions in their original succession is facilitated.

12. The method of processing the tubes of a steam generator of a nuclear reactor, said tubes extending into and being welded to a header and being supported by tube-support plates along their length, the said method comprising inserting an eddy-current probe into a plurality of selected of said tubes, to detect a defective tube, severing that portion of a tube, detected to be defective, at a position along said tube that is a predetermined distance below that tube support plate which is above the detected defective region of the tube and a predetermined distance above the said defective region, severing the weld to said header of said portion, removing the said portion by engaging first the internal surface of said portion and pulling the said portion out of the header a predetermined distance and then engaging the external surface of said portion and pulling the portion out of a further predetermined distance, and examining the portion.

13. The method of claim 12 practice with apparatus including a gripper for gripping the internal surface of the defective tube and a gripper for gripping the external surface of the defective tube, the said method including the steps of first engaging the internal surface of the portion of the tube with the internal-surface gripper after said portion and its weld to the header have been severed, pulling said portion with said internal-surface gripper out of said header a sufficient distance to enable the external surface of said portion to be engaged by said external-surface gripper, engaging said portion with said external-surface gripper, and pulling said portion out of the header a further predetermined distance.

14. The method of claim 13 wherein after the internal surface of the tube is engaged by the internal-surface gripper, the internal-surface gripper is engaged by the external-surface gripper and said portion is pulled out of the header by the cooperation of the internal-surface gripper and external-surface gripper.

15. The method of claim 12 practiced with a portion of a tube to be removed of substantial length, the said method including the step of removing the portion in at least two separate lengths, the first length being severed after said first length is pulled out and the second being thereafter severed after it is pulled out.

16. The method of removing a portion of a U-tube, whose outer ends extend into a header, from the steam generator of a nuclear reactor, with apparatus including a gripper assembly for gripping the internal surface of said portion of said tube and a gripper assembly for gripping the external surface of said portion, the said method comprising operating said internal-surface gripper assembly manually at the start only of a tube-portion removal operation to actuate the internal-surface gripper to engage the internal surface near the outer end of the tube portion and to pull said end from said header, and thereafter operating said external-surface gripper assembly only by remote control to remove the tube portion completely from said steam generator.

17. The method of claim 16 wherein the apparatus includes a tube cutter, the said method comprising operating said tube cutter remotely to cut off successive lengths of the tube portion, each said length being cut off below the header leaving an adequate length of tube extending outwardly from the header to be gripped by the external-surface gripper of the external-surface gripper assembly.

18. The apparatus of claim 1 wherein the base plate is secured to the face of the header by means, connected to the base plate, and engageable with tubes at the location of the header where the portion of the tube to be removed is readily accessible.

* * * * *